United States Patent [19]
Chibata et al.

[11] 3,904,646
[45] Sept. 9, 1975

[54] RESOLUTION OF TRYPTOPHAN USING BENZENESULFONIC ACID AND P-PHENOLSULFONIC ACID

[75] Inventors: Ichiro Chibata, Suita; Shigeki Yamada, Toyonaka; Masao Yamamoto, Hirakata; Hisato Sanematsu, Osaka, all of Japan

[73] Assignee: Tanabe Seiyaku Co., Ltd., Osaka, Japan

[22] Filed: Sept. 17, 1973

[21] Appl. No.: 398,188

[30] Foreign Application Priority Data
Sept. 28, 1972 Japan.............................. 47-97874
Mar. 27, 1973 Japan.............................. 48-35370

[52] U.S. Cl. ............... 260/326.14 T; 260/326.12 R
[51] Int. Cl.² ..................................... C07D 209/20
[58] Field of Search ........... 260/326.14 T, 326.12 R

[56] References Cited
UNITED STATES PATENTS
2,681,927   6/1954   McCollum et al. ........ 260/326.14 T
3,149,122   9/1964   Sasaji et al. ................ 260/326.14 T
3,825,559   7/1974   Tazuke et al............... 260/326.14 T OTHER PUBLICATIONS
Otsuka et al., "Bull. Chem. Soc. Jap.," Vol. 37, pp. 1465 & 1468 (1964).

*Primary Examiner*—Lewis Gotts
*Assistant Examiner*—S. P. Williams
*Attorney, Agent, or Firm*—Bierman & Bierman

[57] ABSTRACT

Seed crystals of one optically active enantiomer of tryptophan benzenesulfonate or tryptophan p-phenolsulfonate are added to a supersaturated solution of DL-tryptophan benzenesulfonate or DL-tryptophan p-phenolsulfonate. Crystallization of said one optically active enantiomer results. The crystals are recovered. Alternatively, crystals of said one optically active enantiomer may be added to a hot solution of the DL-tryptophan benzenesulfonate or DL-tryptophan p-phenolsulfonate to produce a supersaturated solution. The solution is then cooled to crystallize out said one optically active enantiomer. Optically active tryptophan is prepared by treating optically active tryptophan benzenesulfonate or tryptophan p-phenolsulfonate with an alkaline agent or an ion exchange resin.

27 Claims, No Drawings

RESOLUTION OF TRYPTOPHAN USING BENZENESULFONIC ACID AND P-PHENOLSULFONIC ACID

This invention relates to the resolution of DL-tryptophan benzenesulfonate and DL-tryptophan p-phenolsulfonate. It also relates to a process for preparing optically active tryptophan.

Optically active tryptophan, one of essential amino acids, is useful as a food additive, an ingredient of a medicament or a starting material for a tryptophan-containing peptide.

Synthetic tryptophan is optically inactive and consists of equal parts of the two enantiomorphic isomers. Therefore, the optical resolution is required to obtain optically active tryptophan.

Several methods of resolving DL-tryptophan are known. For example, optically active tryptophan may be prepared by asymmetrically hydrolyzing N-acyl-DL-tryptophan with an acylase (e.g., Bulletin of the Agricaltural Chemical Society of Japan, Vol. 21, No. 5, p. 304 – 307, 1957). Alternatively, optically active trypotophan may be prepared by treating N-acyl-DL-tryptophan or alkyl DL-tryptophan with an optically active resolving agent such as bursine, quinine, L(+) -threo-(1-p-nitro phenyl)-2-amino propanol-(1,3), D-camphorsulfonic acid or L-lysin, franctionally crystallizing the resultant mixture of diastereoisomers and hydrolyzing the product (e.g., U.S. Pat. Nos. 3,797,226, 2,813,876, 2,865,928). But these methods have been found to be disadvantageous as they require the conversion of DL-tryptophan into N-acyl-DL-tryptophan or alkyl DL-tryptophan, the preparation of the enzyme, or the use of expensive resolving agents.

Furthermore, optically active tryptophan may be prepared by allowing ammonium salt of N-acyl-DL-tryptophan to preferentially crystallize out in an inert solvent, hydrolyzing the separated ammonium salt of optically active N-acyl-tryptophan with hydrochloric acid (Japanese Publication No. 6183/1963). However, this method is also disadvantageous in that DL-tryptophan must be converted into N-acyl-DL-tryptophan which must be further converted into ammonium salt thereof before the resolution procedure, and that the separated ammonium salt of optically active N-acyl-tryptophan must be hydrolyzed to remove the acyl group therefrom.

Generally, a racemic modification of an organic compound can be resolved by preferential crystallization into each of its optically active enantiomer if the modification exists substantially in the form of the racemic mixture. However, it is impossible to predict whether a given racemic modification has such beneficial properties. It is likewise impossible to predict whether resolution of a given racemic modification is possible. Therefore, each pair of optically active enantiomers must be further studied experimentally to determine whether preferential crystallization can be accomplished. It is advantageous to commercially produce an optically active enantiomer by the method of preferential crystallization. DL-tryptophan itself can not be resolved by the preferential crystallization method.

As a result of various investigations, we have now found that the salt of DL-tryptophan with benzenesulfonic acid or p-phenolsulfonic acid has many beneficial properties which enable one to preferential crystallize it out into each of its optically active enantiomers. DL-tryptophan benzenesulfonate and DL-tryptophan p-phenolsulfonate can be readily prepared in a conventional manner and a supersaturated solution of an enantiomer of these salts is stable even after the preferential crystallization of the other optically active enantiomer. Additionally, prompt crystallization of each of the enantiomers is afforded. Moreover, since the racemic modifications of DL-tryptophan benzenesulfonate and DL-tryptophan p-phenolsulfonate have sufficiently higher solubility as compared with the corresponding enantiomers thereof, the desired optically active tryptophan benzenesulfonate and tryptophan p-phenolsulfonate can be obtained in a high yield even when the preferential crystallization is carried out in an aqueous solution.

One object of the present invention is to provide a novel and useful process for the resolution of DL-tryptophan. Another object of the invention is to provide a process for resolving DL-tryptophan in a high yield and in a simple and more convenient manner. Still another object of the invention is to provide an economical and commercially useful process for preparing optically active tryptophan. A further object of the invention is to provide novel intermediates which are useful in preparing optically active tryptophan. Still further objects of the invention will be apparent from the following description of the specification and claims.

According to the present invention, optically active tryptophan benzenesulfonate and tryptophan p-phenolsulfonate can be prepared by the steps of producing a supersaturated solution of DL-tryptophan benzenesulfonate or DL-tryptophan p-phenolsulfonate in a solvent; seeding or dissolving one of the optically active enantiomers thereof into the super-saturated solution thus making it predominant over the other enantiomer in the solution; allowing the predominant enantiomer to crystallize out preferentially; and then recovering it from the solution.

Tryptophan benzenesulfonate and tryptophan p-phenolsulfonate, in the form of either the racemic modification or optically active enantiomer, are novel compounds which can be readily prepared. For example, DL-tryptophan benzensulfonate and DL-tryptophan p-phenolsulfonate can be prepared by neutralizing DL-tryptophan with benzenesulfonic acid or p-phenolsulfonic acid, respectively, in a suitable solvent. Optically active tryptophan benzenesulfonate and tryptophan p-phenolsulfonate are also prepared in the same manner as above.

The supersaturated solution of the racemic modification can be prepared by applying conventional procedures, such as, for example, refrigeration, concentration, addition of an appropriate solvent or a combination of these operations, to a solution of DL-tryptophan benzenesulfonate or DL-tryptophan p-phenolsulfonate. It is most convenient, however, to prepare by cooling a hot solution saturated with DL-tryptophan benzenesulfonate or DL-tryptophan p-phenolsulfonate, because the solubility thereof increases as the temperature becomes higher. Additionally, DL-tryptophan benzenesulfonate and DL-tryptophan p-phenolsulfonate which are employed in preparing the super-saturated solution are not always an equal mixture of D- and L-enantiomers, but may be an unequal mixture thereof. It is convenient to use an unequal mixture thereof as the starting material of the present invention, because the predominant enantiomer in the mixture may, upon cooling, be spontaneously crystallize out from the supersaturated solution of said material.

When the supersaturated solution of the racemic modification is prepared as above, a small amount of crystals of one of the enantiomers is added to the supersaturated solution as a seed, and the mixture is stirred. Preferential crystallization of the enantiomer which is the same as that seeded results. Alternatively, a small amount of one of the enantiomers is dissolved in a hot solution of the racemic modification in order to make said enantiomer predominant over the other enantiomer in the solution. The solution is then cooled, whereby spontaneous crystallization of the predominant enantiomer takes place. It is also possible to combine these procedures. That is, a part of the said crystals of one of the enantiomers is dissolved in the solution in which one of the enantiomers is dominant over the other. In this case, the amount of seed added can be minimized. The seed crystals employed in the present invention should have a high optical purity. The greater the amount of the seed, the better the resultant resolution. However, the practical proportion of the seed to be added is generally within the range of about 0.05 – 5% based on the weight of the solution. Although the temperature at which the preferential crystallization is carried out is not critical for the invention, a temperature of 10° to 70°C is preferred. The crystallization is enhanced by stirring the solution. Any inert solvent which can dissolve DL-tryptophan benzenesulfonate or DL-tryptophan p-phenolsulfonate and which can afford prompt crystallization of the compound is suitable for the process of preferential crystallization. Examples of suitable inert solvents are; water, a mixture of water and an alkanol having one to 6 carbon atoms, and a mixture of water and an alkanone having 3 to 6 carbon atoms. However, water is most suitable solvent from an industrial standpoint.

The mother liquor which is obtained after isolation of one of the enantiomers by the above-mentioned procedure can be again employed for the optical resolution of the other enantiomer. For example, when a certain amount of the racemic modification which is equal to the amount of the enantiomer previously separated is added to the mother liquor, the same conditions as the previous operation can be obtained except that the predominant enantiomer in the solution will be the antipode of the enantiomer previously separated. Thus, the operation of preferential crystallization can be repeated indefinitely, and the racemic modification which is supplied can be successively and entirely resolved into each of the D- and L-enantiomers.

The process of the present invention can be carried out batchwise, as mentioned above, or in a continuous manner. A continuous process, for example, would comprise of passing the supersaturated solution through a column containing the seed crystals, and allowing an optically active tryptophan benzenesulfonate or tryptophan p-phenolsulfonate to crystallize out preferentially in the column. Alternatively, the process of the present invention can be carried out by immersing the seeding plates of optically active enantiomers in the super-saturated solution and allowing the optically active enantiomers to crystallize out on the seeding plates.

Depending upon the degree of supersaturation and the amount of crystallization, the crystals of the optically active enantiomers thus obtained may sometimes be optically impure. The crude crystals, however, can be easily purified because the solubility of the racemic modification is sufficiently higher than that of each enantiomer and the one optically active enantiomer cannot remain dissolved in the saturated solution of the racemic modification. For example, optically pure crystals of tryptophan benzenesulfonate and tryptophan p-phenolsulfonate can be obtained by adding the crude crystals to sufficient solvent to produce a solution saturated or almost saturated with respect to the racemic modification in the crude crystals, stirring the solution, and recovering the resultant crystals from the solution. Alternatively, the optically pure crystals of tryptophan benzenesulfonate and tryptophan p-phenolsulfonate can be obtained by dissolving the crude crystals at an elevated temperature in a small amount of a solvent which will dissolve the racemic modification in the crude crystals, allowing the enantiomer to crystallize out and recovering it from the solution. Such operations as refrigeration, concentration, addition of a solvent or combinations thereof may be used for crystallization of the optically active enantiomer from the solution. The same solvent as described above can also be employed for this purpose. When only a small amount of solvent is needed due to low contents of the racemic modification in the crude crystals or the high solubility of the racemic modification, it is convenient to carry out the operation by adding a suitable amount of a solution saturated with the racemic modifications.

According to the present invention, the optically active enantiomers thus obtained can be readily converted into optically active tryptophan. Optically active tryptophan is prepared by treating optically active tryptophan benzenesulfonate or tryptophan p-phenolsulfonate with an alkaline agent such as inorganic base (e.g., sodium hydroxide, potassium hydroxide, lithium hydroxide, ammonium hydroxide) or organic base (e.g., methylamine, ethylamine, cyclohexylamine) or with an ion exchange resin (e.g., Amberlite IR-120, Dowex 50W) to remove benzenesulfonic acid or p-phenolsulfonic acid therefrom, respectively. The thus obtained benzenesulfonic acid and p-phenolsulfonic acid can be re-used for preparing the starting materials of the invention, i.e., DL-tryptophan benzenesulfonate and DL-tryptophan p-phenolsulfonate.

Practical and presently-preferred embodiments of the present invention are shown in the following.

EXAMPLE 1

204.2 g DL-tryptophan and 191 g of benzensulfonic acid 3/2 hydrate are dissolved in one liter of water under heating. The solution is treated with activated carbon, and is allowed to stand in a refrigerator overnight. The crystalline precipitate thus formed is collected by filtration, washed with 50 ml of ice-water and then dried under vacuum at 45°C. 264 g of DL-tryptophan benzenesulfonate are obtained.

The filtrate obtained after the isolation of the crystalline precipitate is treated with activated carbon and then concentrated to about 200 ml. The concentrated filtrate is allowed to stand in a refrigerator overnight. The crystalline precipitate thus formed is collected by filtration, washed with ice-water and then dried. 80 g of DL-tryptophan benzenesulfonate are obtained. Total amount: 344 g Yield: 95% M.p. 206° – 208°C Optically active enantiomers of tryptophan benzenesulfonate are also obtained by treating optically active enantiomers of tryptophan in the same manner as above.

The resultant racemic and optically active tryptophan benzenesulfonate, when recrystallized from water, show the following physico-chemical properties.

Table 1

| Tryptophan benzenesulfonate | M.p. (°C) | Specific rotation $[\alpha]_{365}^{25}$ (C=1,H$_2$O) |
|---|---|---|
| DL-form | 210 – 211 | 0° |
| L-form | 234 – 235 | + 16.8° |
| D-form | 234 – 235 | – 16.8° |

Table 2

| Temperature (°C) | Solubility * DL-form | Solubility * Optically active enantiomers |
|---|---|---|
| 15 | 5.7 | 3.5 |
| 35 | 10.7 | 5.6 |
| 50 | 20.7 | 8.9 |

Note:
* : the solubility (g) of tryptophan benzenesulfonate per 100 ml of water.

EXAMPLE 2

204.2 g of DL-tryptophan and 200 g of p-phenolsulfonic acid monohydrate are dissolved in 400 ml of water at 35° – 40°C. The solution is treated with activated carbon, and is allowed to stand in a refrigerator overnight. The crystalline precipitate thus formed is collected by filtration, washed with 100 ml of ice-water and then dried. 272 g of DL-tryptophan p-phenolsulfonate are obtained.

The filtrate obtained after the isolation of the crystalline precipitate is treated with activated carbon and then concentrated to about 200 ml. The concentrated filtrate is allowed to stand in a refrigerator overnight. The crystalline precipitate thus formed is collected by filtration, washed with ice-water and then dried. 88 g of DL-tryptophan p-phenolsulfonate are obtained. Total amount: 360 g Yield : 95% M.p. 187° – 188°C (decomp.)

Optically active enantiomers of tryptophan p-phenolsulfonate are also obtained by treating optically active tryptophan in the same manner as above.

The resultant racemic and optically active tryptophan p-phenolsulfonate, when recrystallized from a 0.25 M p-phenolsulfonic acid aqueous solution, show the following physicochemical properties.

Table 3

| Tryptophan p-phenolsulfonate | M.p.(decomp.) (°C) | Specific rotation $[\alpha]_{365}^{25}$ (C=2,1N-HCl) |
|---|---|---|
| DL-form | 188 – 189 | 0° |
| L-form | 214 – 215 | + 38.0° |
| D-form | 214 – 215 | – 38.0° |

Table 4

| Temperature (°C) | Solubility * DL-form | Solubility * Optically active enantiomers |
|---|---|---|
| 15 | 25.9 | 11.9 |
| 25 | 46.9 | 15.6 |
| 40 | 98.6 | 21.8 |

Note:
* : the solubility (g) of tryptophan p-phenolsulfonate per 100 ml of a 0.25 M p-phenolsulfonic acid aqueous solution.

EXAMPLE 3

1. 20.0 g of DL-tryptophan benzenesulfonate are dissolved in 100 ml of water under heating. The solution is cooled to 25°C, and 1.0 g of L-tryptophan benzenesulfonate is seeded into the solution. The solution is stirred at 25°C for 20 minutes. The crystalline precipitate thus formed is collected by filtration, washed with 2 ml of ice-water, and then dried under vacuum at 45°C. 2.2 g of L-tryptophan benzenesulfonate are obtained.

$[\alpha]_{365}^{25} = + 15.3°$ (C=2, H$_2$O)

Optical purity : 95.6%

2. 2.0 g of L-tryptophan benzenesulfonate obtained in (1) are dissolved in 15 ml of water under heating. The solution is adjusted to pH 6.0 with a 2N-sodium hydroxide aqueous solution, and is allowed to stand in a refrigerator overnight. The crystalline precipitate thus formed is collected by filtration, washed with ice-water and then dried. 1.1 g of L-tryptophan are obtained.

$[\alpha]_D^{25} = -30.2°$ (C=1, H$_2$O)

Example 4

21.0 g of DL-tryptophan benzenesulfonate and 1.0 g of L-tryptophan benzenesulfonate are dissolved in 100 ml of water under heating. The solution is cooled to 25°C, and 0.1 g of L-tryptophan benzenesulfonate is seeded into the solution. The solution is stirred at 25°C for 55 minutes. The crystalline precipitate thus formed is collected by filtration, washed with ice-water and then dried. 2.1 g of L-tryptophan benzenesulfonate are obtained.

$[\alpha]_{365}^{25} = + 14.9°$ (C=2, H$_2$O)

Optical purity : 93.1%

EXAMPLE 5

2.2 g of DL-tryptophan benzenesulfonate are dissolved, under heating, in the mother liquor, obtained after the isolation of L-tryptophan benzenesulfonate in Example 4. The solution is cooled to 25°C, and 0.1 g of D-tryptophan benzenesulfonate is seeded into the solution. The solution is stirred at 25°C for 55 minutes. The crystalline precipitate thus formed is collected by filtration, washed with ice-water and then dried. 2.3 g of D-tryptophan benzenesulfonate are obtained.

$[\alpha]_{365}^{25} = - 14.6°$ (C=2, H$_2$O)

Optical purity : 91.3%

EXAMPLE 6

1. 4.73 g of L-tryptophan and 4.73 g of DL-tryptophan are dissolved, under heating, in 100ml of an aqueous solution containing 9 g of benzenesulfonic acid 3/2 hydrate. The solution is treated with activated carbon, and is allowed to stand at 25°C overnight. The crystalline precipitate thus formed is collected by filtration, washed with 10 ml of ice-water and then dried. 8.54 g of L-tryptophan benzenesulfonate are obtained.

$$[\alpha]_{365}^{25} = +16.5° (C=2, H_2O)$$

Optical purity : 98.2%

2. 8 g of L-tryptophan benzenesulfonate obtained in (1) are dissolved in 60 ml of water under heating. The solution is adjusted to pH 6 with a 5N-ammonium hydroxide aqueous solution, and is allowed to stand in a refrigerator overnight. The crystalline precipitate thus formed is collected by filtration and then dried. 4.30 g of L-tryptophan are obtained.

$$[\alpha]_D^{25} = -31.5° (C=1, H_2O)$$

3. The mother liquor obtained after the isolation of L-tryptophan benzenesulfonate is treated with activated carbon and then concentrated. The crystalline precipitate thus formed is collected by filtration and then dried. 7.95 g of DL-tryptophan benzenesulfonate are obtained.

$$[\alpha]_{365}^{25} = 0° (C=2, H_2O)$$

4. 7.9 g of DL-tryptophan benzenesulfonate obtained in (3) are treated in the same manner as described in (2). 4.43 g of DL-tryptophan are obtained.

EXAMPLE 7

1. 5.00 g of D-tryptophan and 5.00 g of DL-tryptophan are dissolved, under heating, in 156 ml of an aqueous solution containing 9.5 g of benzenesulfonic acid 3/2 hydrate. The solution is stirred at 15°C overnight. The crystalline precipitate thus formed is collected by filtration. 9.02 g of D-tryptophan benzenesulfonate are obtained.

$$[\alpha]_{365}^{25} = -15.8° (C=2, H_2O)$$

Optical purity : 94.0%

2. 8.0 g of D-tryptophan benzenesulfonate obtained in (1) are treated in the same manner as described in Example 6-(2). 4.28 g of D-tryptophan are obtained.

$$[\alpha]_D^{25} = +30.2° (C=1, H_2O)$$

EXAMPLE 8

1. 10.0 g of L-tryptophan benzenesulfonate (Optical purity : 50%) are dissolved in 60 ml of water under heating. The solution is allowed to stand at 25°C overnight. The crystalline precipitate thus formed is collected by filtration. 4.93 g of L-tryptophan benzenesulfonate are obtained.

$$[\alpha]_{365}^{25} = +16.3° (C=2, H_2O)$$

Optical purity : 97.0%

2. 4.7 g of L-tryptophan benzenesulfonate obtained in (1) are treated in the same manner as described in Example 6-(2). 2.54 g of L-tryptophan are obtained.

$$[\alpha]_{365}^{25} = -31.3° (C=1, H_2O)$$

EXAMPLE 9

1. 90.0 g of DL-tryptophan p-phenolsulfonate are dissolved in 100 ml of water under heating. The solution is cooled to 25°C, and 3.0 g of L-tryptophan p-phenolsulfonate are seeded into the solution. The solution is stirred at 25°C for 45 minutes. The crystalline precipitate thus formed is collected by filtration, washed with 5 ml of ice-water and then dried. 11.2 g of L-tryptophan p-phenolsulfonate are obtained.

$$[\alpha]_{365}^{25} = +36.6° (C=2, 1N—HCl)$$

Optical purity : 96.3%

2. 11.0 g of L-tryptophan p-phenolsulfonate obtained in (1) are dissolved in 28 ml of water under heating. The solution is adjusted to pH 6 with a 5N-ammonium hydroxide aqueous solution, and is allowed to stand in a refrigerator overnight. The crystalline precipitate thus formed is collected by filtration, washed with ice-water and then dried. 5.9 g of L-tryptophan are obtained.

$$[\alpha]_D^{25} = -31.2° (C=1, H_2O)$$

EXAMPLE 10

1. 43.5 g of DL-tryptophan p-phenolsulfonate and 4.0 g of L-tryptophan p-phenolsulfonate are dissolved in 50 ml of water under heating. The solution is cooled to 25°C, and 0.05 g of L-tryptophan p-phenolsulfonate is seeded into the solution. The solution is stirred at 25°C for 80 minutes. The crystalline precipitate thus formed is collected by filtration, washed with ice-water and then dried. 8.6 g of L-tryptophan p-phenolsulfonate are obtained.

$$[\alpha]_{365}^{25} = +36.8° (C=2, 1N—HCl)$$

Optical purity : 96.8%

2. 8.8 g of DL-tryptophan p-phenolsulfonate are dissolved, under heating, in the mother liquor obtained after the isolation of L-tryptophan p-phenolsulfonate. The solution is cooled to 25°C, and 0.05 g of D-tryptophan p-phenolsulfonate is seeded into the solution. The solution is stirred at 25°C for 80 minutes. The crystalline precipitate is collected by filtration, washed with ice-water and then dried. 8.8 g of D-tryptophan p-phenolsulfonate are obtained.

$$[\alpha]_{365}^{25} = -36.5° (C=2, 1N—HCL)$$

Optical purity : 96.1%

EXAMPLE 11

20 g of DL-tryptophan are dissolved, under heating, in 50 ml of an aqueous solution containing 19.2 g of p-phenolsulfonic acid. The solution is treated with activated carbon, and 1.0 g of L-tryptophan p-phenolsulfonate is seeded into the solution. The solution is stirred at 25°C for 30 minutes. The crystalline precipitate thus formed is collected by filtration, washed with ice-water and then dried. 5.2 g of L-tryptophan p-phenolsulfonate are obtained.

$$[\alpha]_{365}^{25} = +35.8° (C=2, 1N—HCL)$$

Optical purity : 94.2%

EXAMPLE 12

1. 10.9 g of L-tryptophan p-phenolsulfonate (Optical purity : 22.9%) are dissolved in 32.5 ml of a 0.25 M p-phenolsulfonic acid aqueous solution under heating. The solution is stirred at 15°C overnight. The crystalline precipitate thus formed is collected by filtration, washed with ice-water and then dried under vacuum at room temperature. 2.3 g of L-tryptophan p-phenolsulfonate are obtained.

$[\alpha]_{365}^{25} = +37.8°$ (C=2, 1N—HCl)

Optical purity : 99.2%

2. 2.0 g of L-tryptophan p-phenolsulfonate obtained in (1) are dissolved in 5 ml of water under heating. The solution is cooled to room temperature. The solution is adjusted to pH 6 with a 5N-ammonium hydroxide aqueous solution, and is allowed to stand in a refrigerator overnight. The crystalline precipitate is collected by filtration, washed with 0.5 ml of ice-water and then dried. One g of L-tryptophan is obtained as white crystals.

$[\alpha]_D^{25} = -32.0°$ (C=1, $H_2O$)

3. The mother liquor obtained after the isolation of L-tryptophan p-phenolsulfonate is treated with activated carbon and then concentrated. The crystalline precipitate thus formed is collected by filtration, washed with ice-water and then dried. 8.3 g of DL-tryptophan p-phenolsulfonate are obtained.

$[\alpha]_{365}^{25} = 0°$ (C=2, 1N—HCl)

4. 8.0 g of DL-tryptophan p-phenolsulfonate obtained in (3) are treated in the same manner as described in (2). 4.1 g of DL-tryptophan are obtained.

EXAMPLE 13

1. 16.7 g of D-tryptophan p-phenolsulfonate (Optical purity : 30%) are dissolved in 25 ml of a 0.25 M p-phenolsulfonic acid aqueous solution under heating. The solution is stirred at 25°C overnight. The crystalline precipitate thus formed is collected by filtration, washed with ice-water and then dried under vacuum at room temperature. 4.6 g of D-tryptophan p-phenolsulfonate are obtained.

$[\alpha]_{365}^{25} = -37.0°$ (C=2, 1N—HCl)

Optical purity : 97.0%

2. 4.0 g of D-tryptophan p-phenolsulfonate obtained in (1) are treated in the same manner as described in Example 12-(2). 2.1 g of D-tryptophan are obtained.

$[\alpha]_D^{25} = +31.5°$ (C=1, $H_2O$)

3. The mother liquor obtained after the isolation of D-tryptophan p-phenolsulfonate is treated with activated carbon, and is concentrated. 11.8 g of DL-tryptophan p-phenolsulfonate are obtained.

$[\alpha]_{365}^{25} = 0°$ (C=2, 1N—HCl)

4. 11.5 g of DL-tryptophan benzenesulfonate obtained in (3) are treated in the smae manner as described in Example 12-(2). 5.8 g DL-tryptophan are obtained.

What we claim is:

1. A process for resolving DL-tryptophan benzenesulfonate or DL-tryptophan p-phenolsulfonate into its optically active enantiomers which comprises the steps of adding crystals of one of said enantiomers to a solution of DL-tryptophan benzenesulfonate or DL-tryptophan p-phenolsulfonate, supersaturating said solution whereby crystallization of said one of said enantiomers from the solution is initiated, and recovering the crystallized one of said enantiomers.

2. The process as claimed in claim 1, wherein said one of said enantiomers is added as seed crystals to the supersaturated solution of DL-tryptophan benzenesulfonate.

3. The process as claimed in claim 1, wherein said one of said enantiomers is added as seed crystals to the supersaturated solution of DL-tryptophan p-phenolsulfonate.

4. The process as claimed in claim 1, wherein said one of said enantiomers is added to the solution of DL-tryptophan benzenesulfonate at an elevated temperature, then the DL-tryptophan benzenesulfonate solution is cooled to produce said supersaturated solution.

5. The process as claimed in claim 1, wherein said one of said enantiomers is added to the solution of DL-tryptophan p-phenolsulfonate at an elevated temperature, then the DL-tryptophan p-phenolsulfonate solution is cooled to produce said supersaturated solution.

6. The process as claimed in claim 1, wherein said one of said enantiomers is added to the solution of DL-tryptophan benzenesulfonate at an elevated temperature, then, the DL-tryptophan benzenesulfonate solution is cooled to produce said supersaturated solution, and the supersaturated solution is inoculated with seed crystals of said one of said enantiomers.

7. The process as claimed in claim 1, wherein said one of said enantiomers is added to the solution of DL-tryptophan p-phenolsulfonate at an elevated temperature, then, the DL-tryptophan p-phenolsulfonate solution is cooled to produce said supersaturated solution, and the supersaturated solution is inoculated with seed crystals of said one of said enantiomers.

8. The process as claimed in claim 1, wherein the solution of DL-tryptophan benzenesulfonate is comprised of DL-tryptophan benzenesulfonate and an inert solvent, said solvent being water, a mixture of water and an alkanol having one to 6 carbon atoms, or a mixture of water and an alkanone having 3 to 6 carbon atoms.

9. The process as claimed in claim 1, wherein the solution of DL-tryptophan p-phenolsulfonate is comprised of DL-tryptophan p-phenolsulfonate and an inert solvent, said solvent being water, a mixture of water and an alkanol having one to 6 carbon atoms, or a mixture of water and an alkanone having 3 to 6 carbon atoms.

10. The process as claimed in claim 2, wherein the amount of the seed crystals added is about 0.05 – 5 weight percent based on the weight of the supersaturated solution.

11. The process as claimed in claim 3, wherein the amount of the seed crystals added is about 0.05 – 5 weight percent based on the weight of the supersaturated solution.

12. The process as claimed in claim 1, further including the steps of dissolving, at an elevated temperature, additional DL-tryptophan benzenesulfonate in mother liquor obtained after the recovery of said crystallized one of said enantiomers, thereby producing another supersaturated solution, crystallizing said other one of said enantiomers from said another supersaturated solution and recovering the crystallized other one of said enantiomers.

13. The process as claimed in claim 1, further including the steps of dissolving, at an elevated temperature, additional DL-tryptophan p-phenolsulfonate in mother liquor obtained after the recovery of said crystallized one of said enantiomers, thereby producing another supersaturated solution, crystallizing said other one of said enantiomers from said another supersaturated solution and recovering the crystallized other one of said enantiomers.

14. The process as claimed in claim 12, wherein said process is repeated a plurality of times, whereby said optically active enantiomers are successively and alternately separated as crystals from the solution of DL-tryptophan benzenesulfonate.

15. The process as claimed in claim 13, wherein said process is repeated a plurality of times, whereby said optically active enantiomers are successively and alternately separated as crystals from the solution of DL-tryptophan p-phenolsulfonate.

16. The process as claimed in claim 14, further including the step of adding the crystals of one of said separated enantiomers to sufficient solvent to produce a solution saturated or almost saturated with respect to DL-tryptophan benzenesulfonate, stirring this solution and recovering crystals which form.

17. The process as claimed in claim 15, further including the step of adding the crystals of one of said separated enantiomers to sufficient solvent to produce a solution saturated or almost saturated with respect to DL-tryptophan p-phenolsulfonate, stirring this solution and recovering crystals which form.

18. The process as claimed in claim 14, further including the step of dissolving the crystals of one of said separated enantiomers into water, a mixture of water and an alkanol having 1–6 carbon atoms or a mixture of water and an alkanone having 3 to 6 carbon atoms allowing said dissolved one of said separated enantiomers to crystallize out and recovering it from the solution.

19. The process as claimed in claim 15, further including the step of dissolving the crystals of one of said separated enantiomers into water, a mixture of water and an alkanol having 1–6 carbon atoms or a mixture of water and an alkanone having 3 to 6 carbon atoms allowing said dissolved one of said separated enantiomers to crystallize out and recovering it from the solution.

20. The process as claimed in claim 16, wherein said crystals of one of said separated enantiomers is added to a solution saturated with DL-tryptophan benzenesulfonate.

21. The process as claimed in claim 17, wherein said crystals of one of said separated enantiomers is added to a solution saturated with DL-tryptophan p-phenolsulfonate.

22. The process as claimed in claim 18, wherein said crystals of one of said separated enantiomers is dissolved in a solution saturated with DL-tryptophan benzenesulfonate.

23. The process as claimed in claim 19, wherein said crystals of one of said separated enantiomers is dissolved in a solution saturated with DL-tryptophan p-phenolsulfonate.

24. The process for preparing optically active tryptophan which comprises the steps of adding one of optically active enantiomer of tryptophan benzenesulfonate or tryptophan p-phenolsulfonate to an aqueous solution of DL-tryptophan benzenesulfonate or DL-tryptophan p-phenolsulfonate, supersaturating the solution, crystallizing the one of optically active enantiomer from the supersaturated solution, recovering the crystallized optically active enantiomer, and then treating the recovered crystallized optically active enantiomer with an alkaline agent or ion-exchange resin.

25. DL-tryptophan p-phenolsulfonate.
26. L-tryptophan p-phenolsulfonate.
27. D-tryptophan p-phenolsulfonate.

* * * * *